US012791777B2

(12) United States Patent
Ishihara

(10) Patent No.: US 12,791,777 B2
(45) Date of Patent: Nov. 10, 2026

(54) DETECTION DEVICE WITH SHUTTER, WAVEGUIDE, AND SIDE LIGHT SOURCE

(71) Applicant: Magnolia White Corporation, Tokyo (JP)

(72) Inventor: Tomoyuki Ishihara, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 103 days.

(21) Appl. No.: 19/018,827

(22) Filed: Jan. 13, 2025

(65) Prior Publication Data

US 2025/0231333 A1 Jul. 17, 2025

(30) Foreign Application Priority Data

Jan. 16, 2024 (JP) ................................ 2024-004850

(51) Int. Cl.
*H04N 23/55* (2023.01)
*F21V 8/00* (2006.01)
*H04N 23/56* (2023.01)

(52) U.S. Cl.
CPC ........... *G02B 6/0016* (2013.01); *H04N 23/55* (2023.01); *H04N 23/56* (2023.01)

(58) Field of Classification Search
CPC ...... G02B 6/0016; G02B 6/004; H04N 23/55; H04N 23/56
See application file for complete search history.

(56) References Cited

U.S. PATENT DOCUMENTS 7,543,973 B2 * 6/2009 Shimura .............. G02B 3/0031 362/625
9,805,630 B2 * 10/2017 Franklin .............. G02B 6/0028

FOREIGN PATENT DOCUMENTS

JP 2018-033430 A 3/2018

* cited by examiner

*Primary Examiner* — Rebecca C Bryant
(74) *Attorney, Agent, or Firm* — K&L Gates LLP

(57) ABSTRACT

According to an aspect, a detection device includes: a planar shutter device capable of changing transmittance of light; a light-transmitting light guide plate that overlaps one side of the planar shutter device in a first direction; an optical sensor that overlaps one side of the light guide plate in the first direction and comprises a plurality of photodiodes arranged in a plane; and a light source that is disposed adjacent to the light guide plate in a second direction intersecting the first direction and is configured to emit light to a side surface of the light guide plate.

11 Claims, 13 Drawing Sheets

DETECTION DEVICE WITH SHUTTER, WAVEGUIDE, AND SIDE LIGHT SOURCE

CROSS-REFERENCE TO RELATED APPLICATION

This application claims the benefit of priority from Japanese Patent Application No. 2024-004850 filed on Jan. 16, 2024, the entire contents of which are incorporated herein by reference.

BACKGROUND

1. Technical Field

What is disclosed herein relates to a detection device.

2. Description of the Related Art

Japanese Patent Application Laid-open Publication No. 2018-033430 (JP-A-2018-033430) discloses a biosensor that includes an optical sensor including a photosensor (photodetection element), a culture vessel placed on the upper side of an imaging surface of the photosensor, and a light-emitting element disposed above the culture vessel. In the biosensor of JP-A-2018-033430, light emitted from the light-emitting element passes through a culture medium and a plurality of objects to be detected (microorganisms) in the culture vessel, and enters the photosensor.

The light that enters the photosensor contains unwanted light that corresponds to what is called noise. Therefore, a captured image of the objects to be detected may be blurred or become hazy.

For the foregoing reasons, there is a need for a detection device with higher accuracy of detection.

SUMMARY

According to an aspect, a detection device includes: a planar shutter device capable of changing transmittance of light; a light-transmitting light guide plate that overlaps one side of the planar shutter device in a first direction; an optical sensor that overlaps one side of the light guide plate in the first direction and comprises a plurality of photodiodes arranged in a plane; and a light source that is disposed adjacent to the light guide plate in a second direction intersecting the first direction and is configured to emit light to a side surface of the light guide plate.

DETAILED DESCRIPTION

Figure 1:
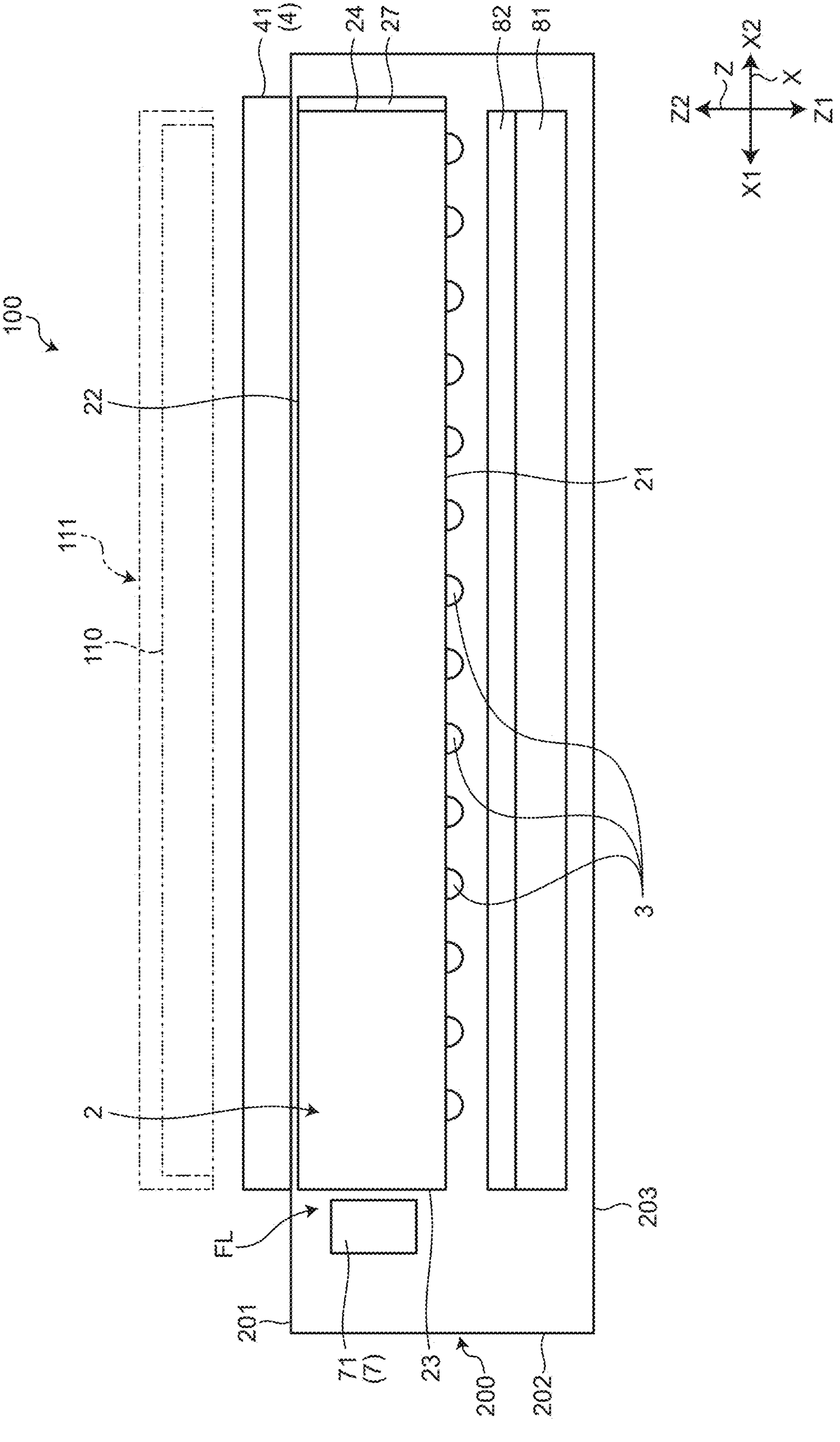
FIG. 1 is a side view schematically illustrating a detection device according to a first embodiment of the present disclosure.

The following describes modes (embodiments) for carrying out the present invention in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure.

To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In XYZ coordinates in the drawings, a Z direction (first direction) corresponds to the up-down direction; an X direction (second direction) corresponds to the left-right direction; and a Y direction corresponds to the front-rear direction. The X direction intersects (at right angles) the Y and Z directions; the Y direction intersects (at right angles) the X and Z directions; and the Z direction intersects (at right angles) the X and Y directions. A Z1 side is one side in the first direction, and a Z2 side is the other side in the first direction.

First Embodiment

First, a first embodiment of the present disclosure will be described. FIG. 1 is a side view schematically illustrating a detection device according to the first embodiment.

As illustrated in FIG. 1, a detection device 100 includes a housing 200, a front light FL, an optical sensor 81, an optical filter 82, a liquid crystal shutter 41, and an object placement stage 111. The liquid crystal shutter 41 is an example of a planar shutter device 4. The front light FL includes a light guide plate 2, scatterers 3, and a light source device 7. That is, in other words, the detection device 100 includes the housing 200, the light guide plate 2, the light source device 7, the scatterers 3, the optical sensor 81, the optical filter 82, the liquid crystal shutter 41, and the object placement stage 111. The term "planar" in this specification indicates, for example, a shape along a plane intersecting the Z direction.

As illustrated in FIG. 1, the housing 200 is a light-transmitting box. Specifically, the housing 200 include a top surface 201, side surfaces 202, and a bottom surface 203. The top surface 201, the side surfaces 202, and the bottom surface 203 are light-transmitting plates, for example. In the present disclosure, however, the side surfaces 202 and the bottom surface 203 may be non-light-transmitting. The side surfaces 202 extend from outer peripheral edges of the bottom surface 203 toward the Z1 side. The top surface 201 is attached to outer peripheral edges of the side surfaces 202. The light guide plate 2, the light source device 7, the scatterer 3, the optical sensor 81, and the optical filter 82 are accommodated in the housing 200. The liquid crystal shutter 41 is provided on the upper side (Z2 side) of the top surface 201 of the housing 200, and the object placement stage 111 is located above the liquid crystal shutter 41.

Although the present embodiment illustrates an aspect in which the object placement stage 111 is provided, the object placement stage 111 is not an essential component member. Therefore, the detection device 100 without the object placement stage 111 is also applicable as an aspect of the present invention.

The light guide plate 2 has a light-transmitting property. The light guide plate 2 is a flat plate-shaped member. The light guide plate 2 has a first surface 21, a second surface 22, a side surface 23, and a back surface 24. The first surface 21 is a principal surface on the Z1 side, and the second surface 22 is a surface on the side (that is, the Z2 side) opposite to the first surface 21. The side surface 23 is located on an X1 side, and the back surface 24 is located on an X2 side. A reflective plate 27 is bonded to the back surface 24. The reflective plate 27 reflects light 120 (refer to FIG. 5) propagating in the light guide plate 2 to reduce the light 120 leaking from the back surface 24 toward outside the light guide plate 2.

The light source device 7 faces the side surface 23 of the light guide plate 2. The light source device 7 is located on the X1 side of the side surface 23 of the light guide plate 2. The light source device 7 emits the light 120 (refer to FIG. 5) to the side surface 23 of the light guide plate 2. The light source device 7 includes a plurality of light sources 71, for example. The light sources 71 are referred to as light-emitting elements and are a plurality of light-emitting diodes (LEDs), for example. That is, the light sources 71 are arranged along the Y direction and arranged so as to face the side surface 23 of the light guide plate 2.

The scatterer 3 is provided on the first surface 21 of the light guide plate 2. The scatterer 3 is an example of an optical structure. The scatterer 3 causes the light 120 that has entered the light guide plate 2 to exit toward the Z2 side (liquid crystal shutter 41 side). The scatterer 3 is, for example, a hemispherical light-transmitting member that protrudes in a convex manner toward the Z1 side from the first surface 21 of the light guide plate 2. The scatterers 3 are arranged in the X and Y directions in a matrix having a row-column configuration. The multiple scatterers 3 are arranged at even intervals in the X and Y directions. The scatterer 3 may have a recessed shape instead of a protruding shape.

As illustrated in FIG. 1, the optical sensor 81 and the optical filter 82 are arranged so as to overlap the light guide plate 2 as viewed in the Z direction. The optical sensor 81 and the optical filter 82 are arranged on the Z1 side of the light guide plate 2. As illustrated in FIG. 6 to be explained later, the optical sensor 81 includes an array substrate 811 and a plurality of sensor pixels 812 (photodetection elements 813, or photodiodes) formed on the array substrate 811. The optical sensor 81 is located on the Z1 side of the optical filter 82. That is, the optical filter 82 is located between the optical sensor 81 and the light guide plate 2. The optical filter 82 is an optical element that transmits, toward the optical sensor 81, components of light 123 (refer to FIG. 5) reflected by an object to be detected 110 and traveling in the Z direction. Examples of the optical filter 82 include, but are not limited to, a collimator (collimating apertures) and a louver. The optical sensor 81 and the optical filter 82 will be described later.

The object placement stage 111 is, for example, a light-transmitting Petri dish. In the present disclosure, however, the object placement stage 111 may be non-light-transmitting. The object to be detected 110 is placed on the object placement stage 111. The object to be detected 110 is, for example, microorganisms such as bacteria or a sample containing bacteria.

Figure 2:
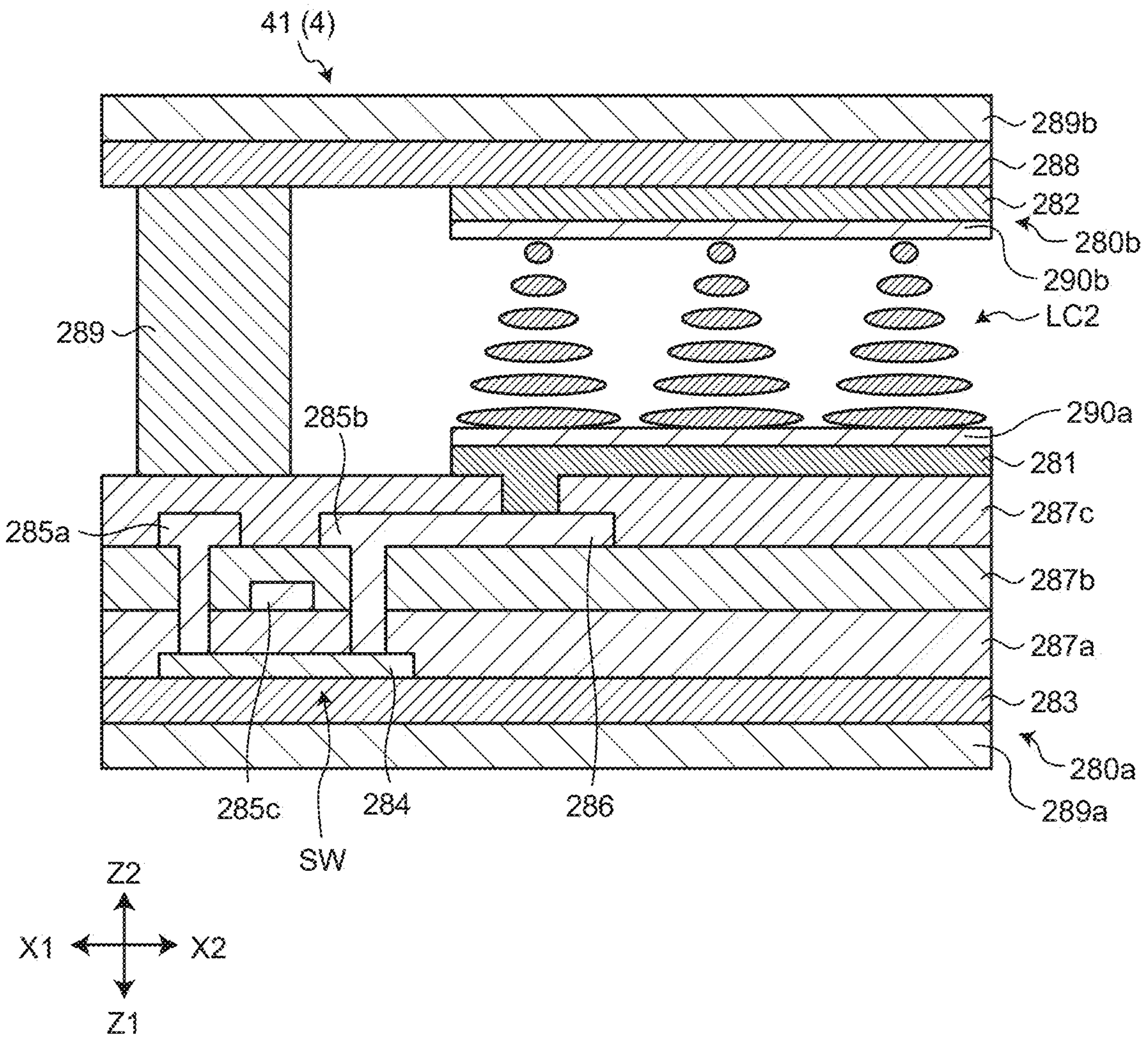
FIG. 2 is a schematic view illustrating a section of a liquid crystal shutter according to the first embodiment.

FIG. 2 is a schematic view illustrating a section of the liquid crystal shutter according to the first embodiment. The liquid crystal shutter 41 can transmit or block light entering from a liquid crystal layer LC2, by controlling a twisted state of liquid crystal molecules by turning on or off a voltage applied to electrodes.

The liquid crystal shutter 41 includes a first substrate **280*a*, a second substrate 280*b*, and the liquid crystal layer LC2. Specifically, the second substrate 280*b* is provided on the Z2 side of the first substrate 280*a* such that a gap is interposed between the second substrate 280*b* and the first substrate 280*a*, and the liquid crystal layer LC2 is provided in the gap between the second substrate 280*b* and the first substrate 280*a***.

The first substrate **280*a* includes a first polarizer 289*a*, a first transparent substrate 283, an insulating layer 287*a*, an insulating layer 287*b*, an insulating layer 287*c*, a first electrode 281, and a first orientation film 290*a*. Specifically, the first polarizer 289*a*, the first transparent substrate 283, the insulating layer 287*a*, the insulating layer 287*b*, the insulating layer 287*c*, the first electrode 281, and the first orientation film 290*a*** are stacked in this order from the Z1 side toward the Z2 side.

The second substrate **280*b* includes a second polarizer 289*b*, a second transparent substrate 288, a second electrode 282, and a second orientation film 290*b*. Specifically, the second polarizer 289*b*, the second transparent substrate 288, the second electrode 282, and the second orientation film 290*b*** are stacked in this order from the Z2 side toward the Z1 side.

The first polarizer **289*a* and the second polarizer 289*b* each transmit components of incident light that vibrate in a predetermined direction. The first polarizer 289*a* and the second polarizer 289*b*** each block components of the light that vibrate in directions other than the predetermined direction.

The first transparent substrate 283 and the second transparent substrate 288 are glass substrates, for example. The first electrode 281 and the second electrode 282 are light-transmitting electrodes using indium tin oxide (ITO), for example. The first orientation film 290*a* and the second orientation film 290*b* are made of polyimide (PI), for example. The orientation films are each provided to control the orientation of the liquid crystal molecules when the liquid crystal molecules are required to be aligned in one direction over a certain degree of wide area.

The liquid crystal shutter 41 includes a switch SW made of a thin-film transistor (TFT), for example. The switch SW includes a channel 284, a source 285*a*, a drain 285*b*, and a gate 285*c* mounted on the first transparent substrate 283 of the first substrate 280*a*. The source 285*a* is supplied with a potential based on a local dimming signal. The drain 285*b* is electrically coupled to wiring 286. The switch SW switches between supplying a drain current to the first electrode 281 and not supplying the drain current thereto depending on the presence or absence of a signal to the gate 285*c*.

Figure 3:
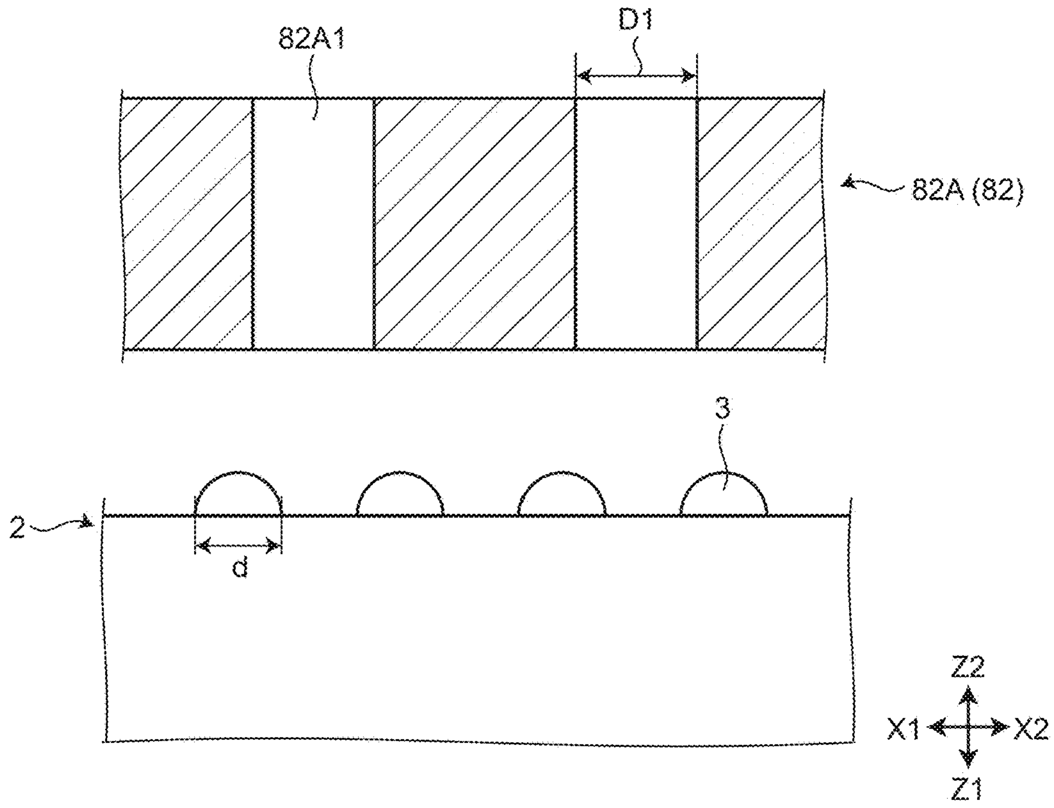
FIG. 3 is an enlarged schematic view of a section of a collimator and a light guide plate that are one example of an optical filter.
Figure 4:
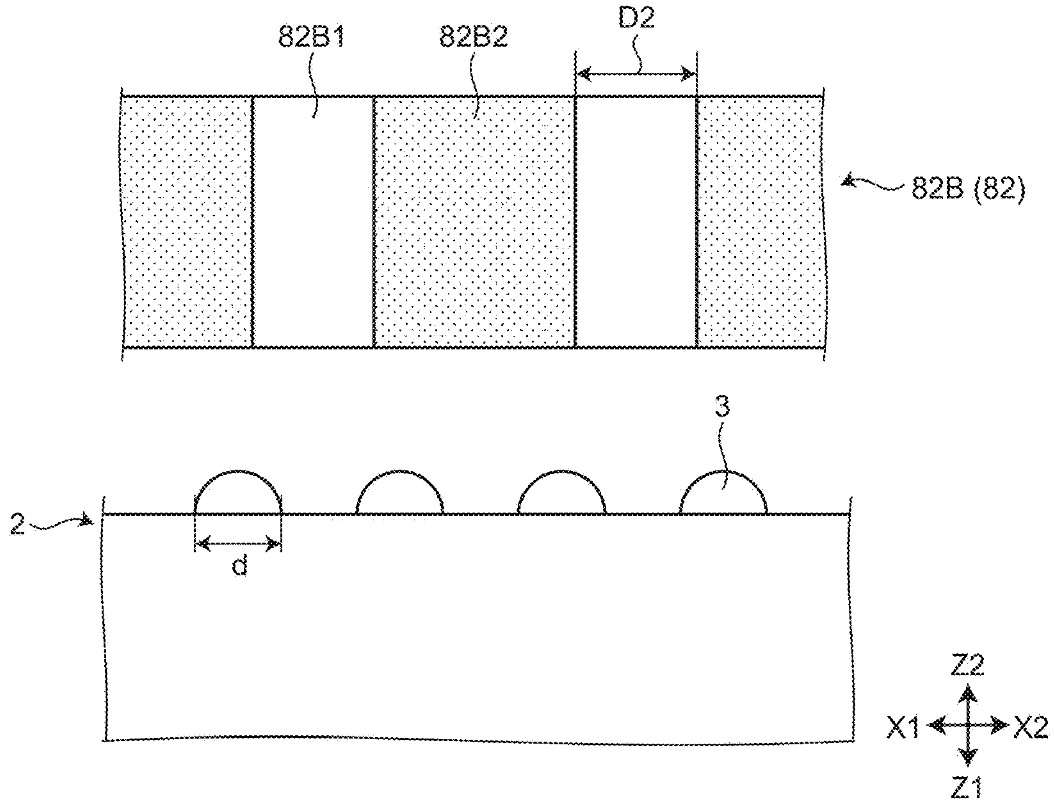
FIG. 4 is an enlarged schematic view of a section of a louver and the light guide plate that are one example of the optical filter.

The following describes the optical filter. FIG. 3 is an enlarged schematic view of a section of the collimator and the light guide plate that are one example of the optical filter. FIG. 4 is an enlarged schematic view of a section of the louver and the light guide plate that are one example of the optical filter. The optical filter 82 is an optical element that transmits, toward the optical sensor 81, components of the light 120 reflected by the object to be detected 110 and traveling in the Z direction. The optical filter 82 includes light-blocking portions and light guide portions. The light-blocking portions have higher light absorbance than the light guide portions.

As illustrated in FIG. 3, a collimator 82A includes cylindrical holes 82A1 (light guide portions) extending along the Z direction. The holes 82A1 transmit, toward the optical sensor 81, the light 120 reflected by the object to be detected 110. A diameter D1 (maximum distance along the X direction in the section) of each of the holes 82A1 is larger than a diameter "d" of the scatterer 3.

As illustrated in FIG. 4, a louver 82B includes plate-like light-blocking portions 82B2 and light guide portions 82B1. The light-blocking portions 82B2 and the light guide portions 82B1 extend in the Z direction. The light-blocking portions 82B2 and the light guide portions 82B1 are alternately arranged along the X direction. The light-blocking portions 82B2 have higher light absorbance than the light guide portions 82B1. The light guide portions 82B1 transmit, toward the optical sensor 81, the light 120 reflected by the object to be detected 110. A thickness D2 along the X direction (maximum distance along the X direction in the section) of each of the light guide portions 82B1 is larger than the diameter "d" of the scatterer 3.

Figure 5:
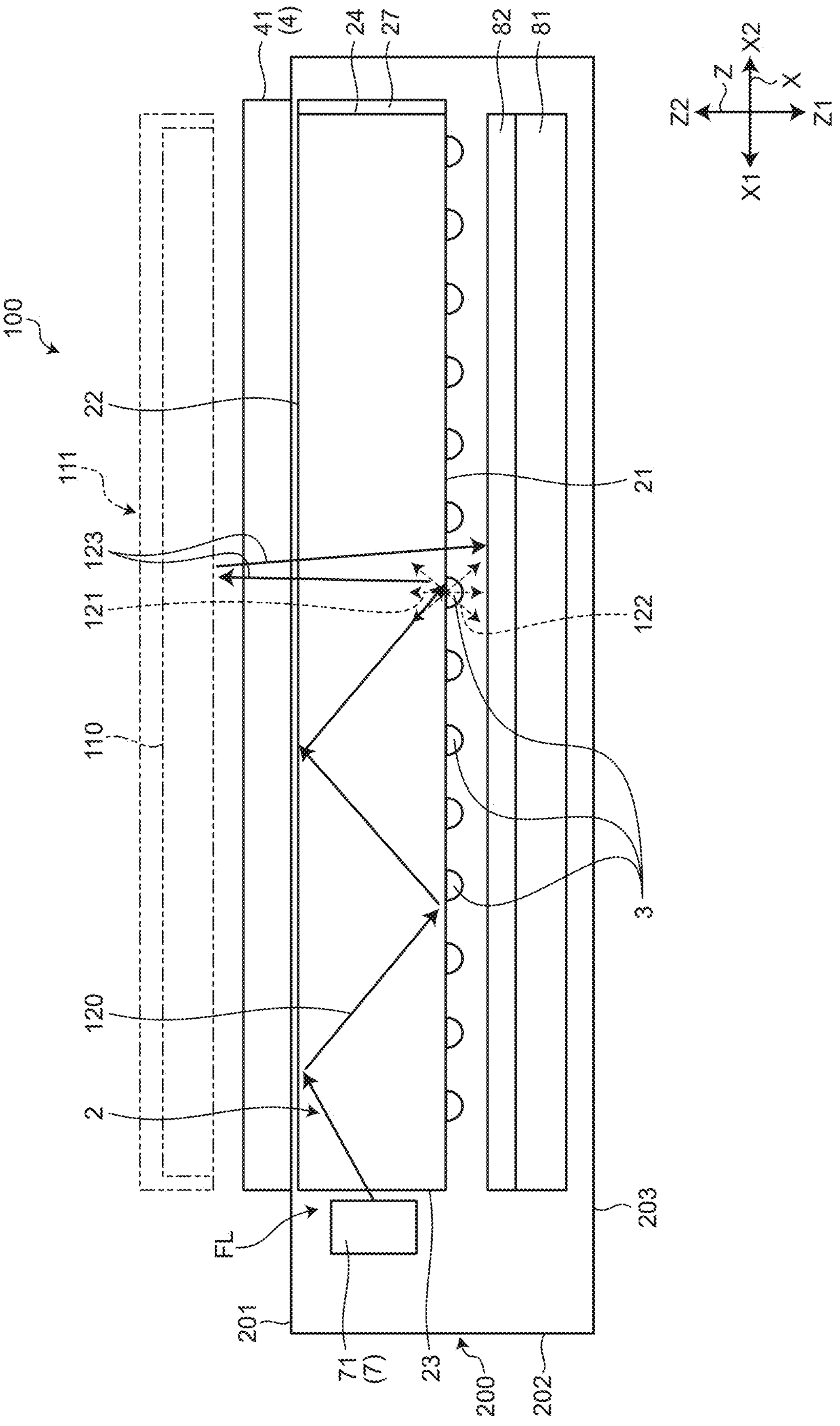
FIG. 5 is a side view schematically illustrating propagation of light in the light guide plate.
Figure 6:
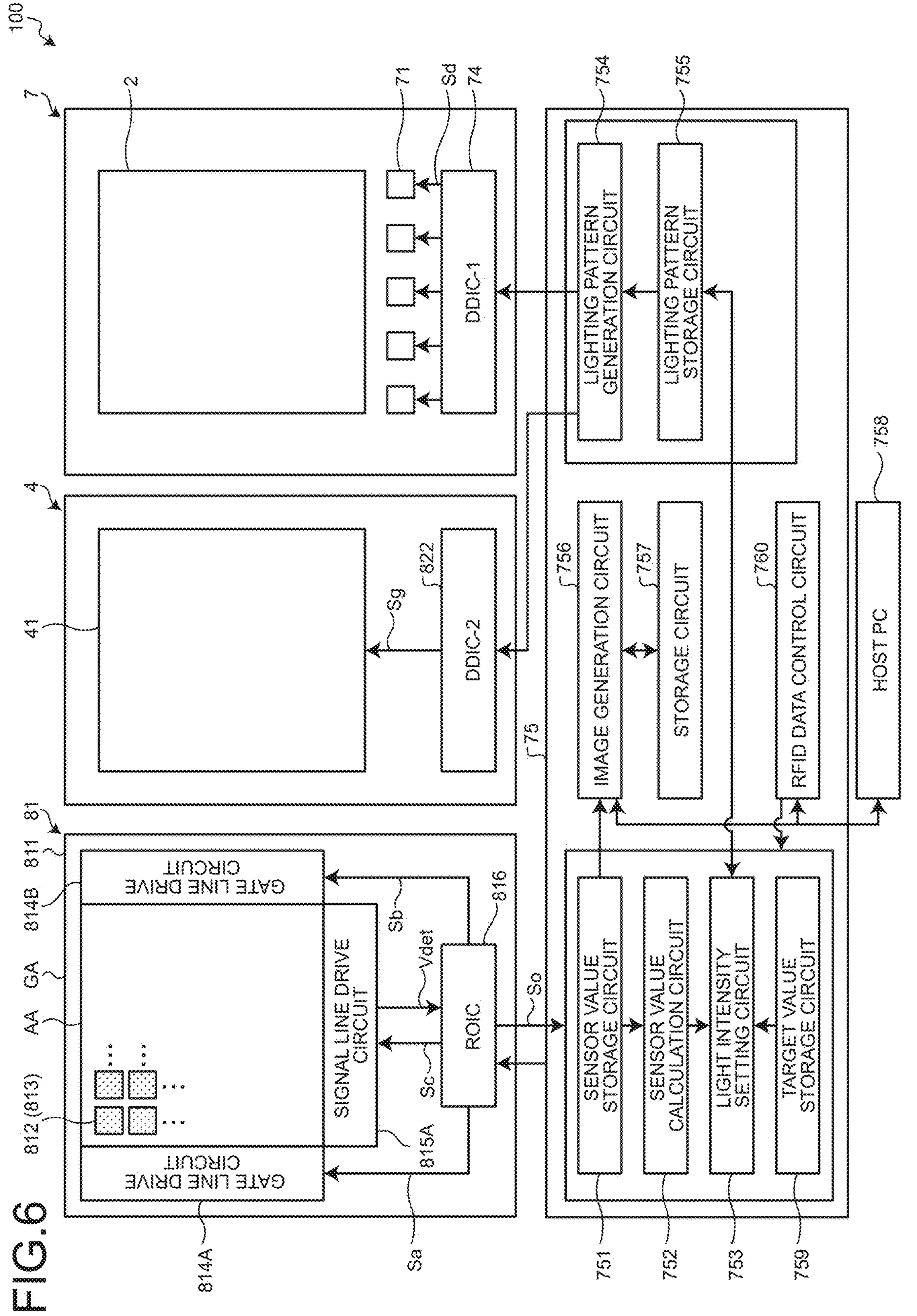
FIG. 6 is a block diagram illustrating a configuration example of the detection device.

The following briefly describes a state of propagation of the light, with reference to FIG. 5. FIG. 5 is a side view schematically illustrating the propagation of the light in the light guide plate. As illustrated in FIG. 5, the light 120 emitted from the light sources 71 enters the inside of the light guide plate 2 from the side surface 23 of the light guide plate 2, and propagates in the X direction in the light guide plate 2 while being repeatedly totally reflected on the first surface 21 and the second surface 22. Part of the light 120 propagating in the light guide plate 2 is scattered to and becomes scattered light 121 by the scatterers 3. The light 123 as part of the scattered light 121 is output from the second surface 22 of the light guide plate 2 toward the object to be detected 110 and then reflected by the object to be detected 110. The reflected light is transmitted through the light guide plate 2 and the optical filter 82 and applied to the photodiodes 813 of the optical sensor 81. The scattered light 121 scattered by the scatterers 3 includes also light 122 traveling toward the optical filter 82, other than the light 123 traveling toward the object to be detected 110.

FIG. 6 is a block diagram illustrating a configuration example of the detection device. As illustrated in FIG. 6, the detection device 100 includes the optical sensor 81, the planar shutter device 4, the light source device 7, and a signal control integrated circuit (IC) 75. The optical sensor 81 includes the array substrate 811, the sensor pixels 812 (photodetection elements 813, or photodiodes) formed on the array substrate 811, gate line drive circuits 814A and 814B, a signal line drive circuit 815A, and a detection control circuit 816 (ROIC).

The array substrate 811 is formed using a substrate as a base. Each of the sensor pixels 812 is configured with a corresponding one of the photodetection elements 813, a plurality of transistors, and various types of wiring.

The array substrate 811 has a detection area AA and a peripheral area GA. The detection area AA is an area provided with the sensor pixels 812 (photodetection elements 813). The peripheral area GA is an area between the outer perimeter of the detection area AA and the outer edges of the array substrate 811, and is an area not provided with the sensor pixels 812. The gate line drive circuits 814A and 814B, the signal line drive circuit 815A, and the detection control circuit 816 are provided in the peripheral area GA.

Each of the sensor pixels 812 is an optical sensor that includes the photodetection element (photodiode) 813 as a sensor element. Each of the photodetection elements 813 outputs an electrical signal corresponding to light emitted thereto.

The detection control circuit 816 is a circuit that supplies control signals Sa, Sb, and Sc to the gate line drive circuits 814A and 814B and the signal line drive circuit 815A, respectively, to control operations of these circuits. The detection control circuit 816 includes a signal processing circuit that processes detection signals Vdet from the photodetection elements 813.

The detection control circuit 816 processes the detection signals Vdet from the photodetection elements 813, and outputs sensor values So based on the detection signals Vdet to the signal control IC 75. Through this operation, the detection device 100 detects information on the object to be detected 110.

The planar shutter device 4 includes the liquid crystal shutter 41 and a liquid crystal drive circuit (DDIC-2) 822. The liquid crystal shutter 41 has the configuration described above with reference to FIG. 2. The liquid crystal drive circuit 822 is a circuit that controls operations of liquid crystals by supplying control signals Sg to the liquid crystal shutter 41.

The light source device 7 includes the light sources 71 and a light-emitting element control circuit (DDIC-1) 74. The light sources 71 are electrically coupled to the light-emitting element control circuit 74 via wiring 74*a*.

The light sources 71 are located so as to face the side surface 23 of the light guide plate 2. The light sources 71 are driven between on (lit state) and off (unlit state) by a command Sd of the light-emitting element control circuit 74.

The signal control IC 75 includes, as a control circuit for the optical sensor 81, a sensor value storage circuit 751, a sensor value calculation circuit 752, a light intensity setting circuit 753, and a target value storage circuit 759. The sensor value storage circuit 751 stores therein the sensor values So output from the detection control circuit 816 of the optical sensor 81. The sensor value calculation circuit 752 performs a predetermined calculation process on the sensor values So of the photodetection elements 813.

In a light intensity setting mode, the light intensity setting circuit 753 compares the sensor values So detected by the photodetection elements 813 with a preset target sensor value So-t acquired from the target value storage circuit 759 to set light intensities of the light sources 71 for detection. The target value storage circuit 759 stores therein the preset target sensor value So-t.

The signal control IC 75 includes, as a control circuit for the light source device 7, a lighting pattern generation circuit 754 and a lighting pattern storage circuit 755. The lighting pattern storage circuit 755 stores therein information on the light intensity of each of the light sources 71 in the light intensity setting mode.

The lighting pattern generation circuit 754 generates various control signals based on the information on the light intensity in the lighting pattern storage circuit 755.

The signal control IC 75 includes an image generation circuit 756 and a storage circuit 757. In a detection mode, an image generation circuit 756 generates an image of the object to be detected 110, based on the sensor values So output from the photodetection elements 813. The storage circuit 757 stores therein image data generated by the image generation circuit 756. The signal control IC 75 is coupled to a host computer (PC) 758 and transfers the image data to the host PC 758.

Figure 7:
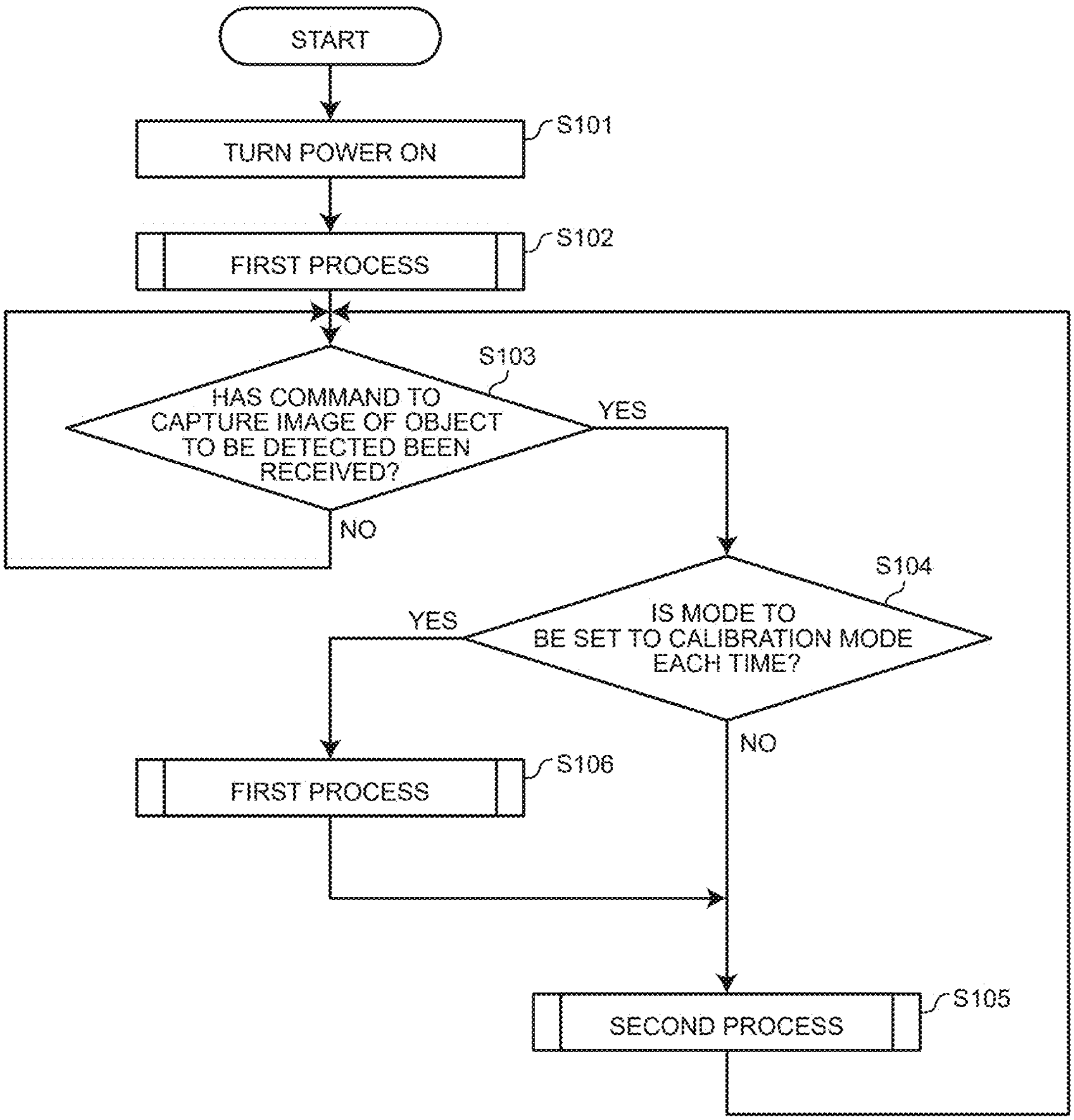
FIG. 7 is a flowchart illustrating an exemplary detection operation of the detection device according to the first embodiment.
Figure 8:
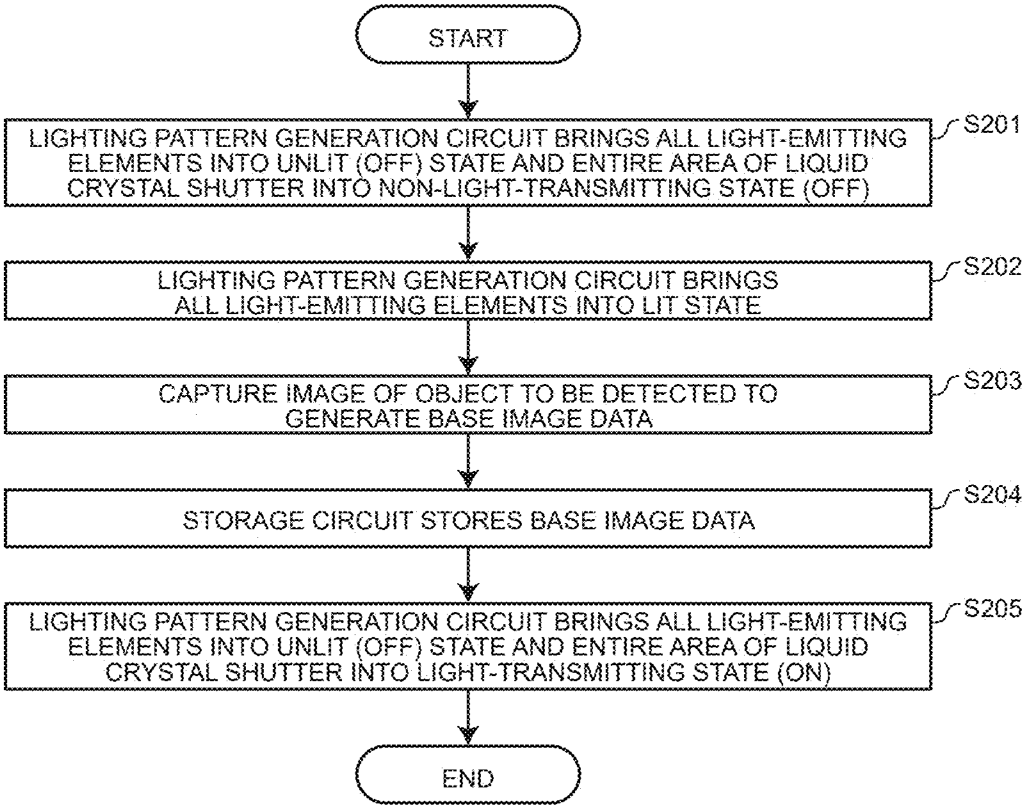
FIG. 8 is a flowchart illustrating a first process in FIG. 7.
Figure 9:
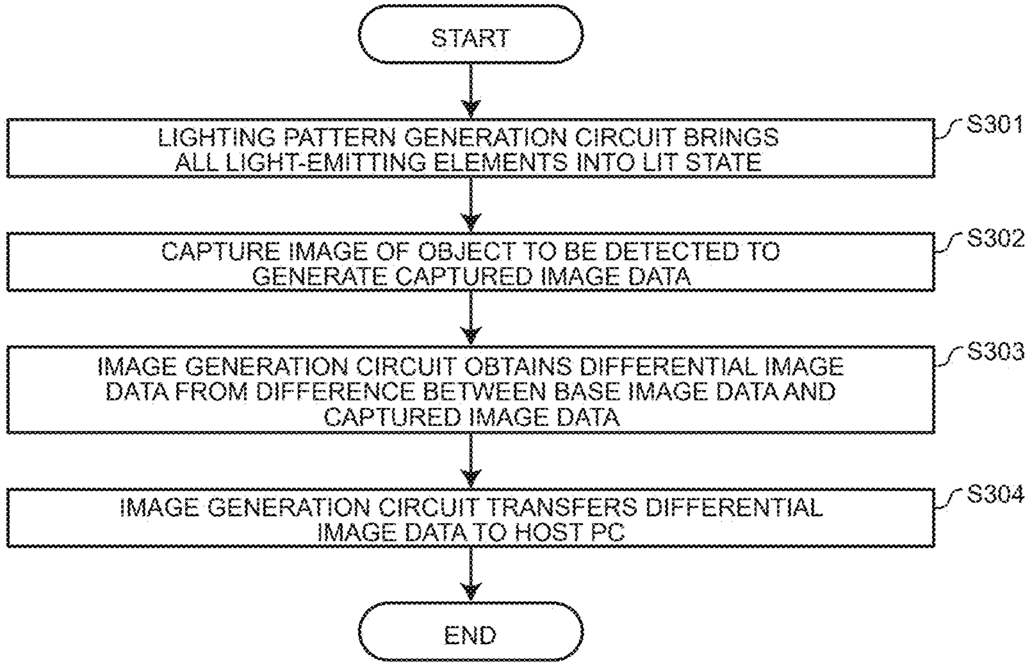
FIG. 9 is a flowchart illustrating a second process in FIG. 7.

The following describes an exemplary detection operation of the detection device according to the first embodiment with reference to FIGS. 7, 8, and 9. FIG. 7 is a flowchart illustrating the exemplary detection operation of the detection device according to the first embodiment. FIG. 8 is a flowchart illustrating a first process in FIG. 7. FIG. 9 is a flowchart illustrating a second process in FIG. 7.

First, as illustrated in FIG. 7, at Step S101, the power of the detection device 100 is turned on to start the detection device 100. Then, the first process at Step S102 is performed. The first process is as illustrated in FIG. 8.

That is, first, at Step S201, the lighting pattern generation circuit 754 (refer to FIG. 6) brings all the light sources (light-emitting elements) 71 into the unlit (off) state and the entire area of the liquid crystal shutter 41 into a non-light-transmitting state (off). This operation brings all the light sources 71 illustrated in FIG. 6 into the unlit state and the entire area of the liquid crystal shutter 41 into the closed off state.

The lighting pattern generation circuit 754 then brings all the light sources 71 into the lit state (Step S202). This operation keeps the liquid crystal shutter 41 in the non-light-transmitting state and brings the light sources 71 into the lit state.

The image generation circuit 756 (illustrated in FIG. 6) captures an image of the object to be detected to generate base image data (Step S203), and the storage circuit 757 stores therein the base image data (Step S204). As a result, the base image data when the liquid crystal shutter 41 is in the non-light-transmitting state is stored in the storage circuit 757.

Thereafter, the lighting pattern generation circuit 754 brings all the light sources 71 into the unlit (off) state and the entire area of the liquid crystal shutter 41 into a light-transmitting state (on) (Step S205). Thus, the first process is completed.

After the first process ends, the signal control IC 75 determines whether a command signal to capture an image of the object to be detected 110 has been received (Step S103). If the signal control IC 75 determines that the command signal has not been received, the signal control IC 75 performs the process at Step S103 again. If the signal control IC 75 determines that the command signal has been received, the signal control IC 75 performs a process at Step S104.

At Step S104, the signal control IC 75 determines whether to set the mode to a calibration mode each time to capture the image. If the signal control IC 75 determines to set the mode to the calibration mode, the signal control IC 75 performs a process at Step S106. If the signal control IC 75 determines not to set the mode to the calibration mode, the signal control IC 75 performs a process at Step S105. The process at Step S106 is the first process illustrated in FIG. 8 and has already been described. The second process at Step S105 is as illustrated in FIG. 9.

That is, first, at Step S301, the lighting pattern generation circuit 754 brings all the light sources 71 into the lit state. This operation brings the entire area of the liquid crystal shutter 41 into the light-transmitting state (on) and all the light sources 71 into the lit state. The image generation circuit 756 (refer to FIG. 6) captures the image of the object to be detected 110 to generate the captured image data, and the storage circuit 757 stores the captured image data (Step S302). The image generation circuit 756 then obtains differential image data based on the difference between the base image data and the captured image data (Step S303). The image generation circuit 756 transfers the differential image data to the host PC (Step S304). After Step S304, the processing returns to Step S103, and the presence or absence of the next image capturing command is checked. Then, the processes at Steps S104, S105, and S106 are repeated.

As explained above, in the first embodiment, the detection device 100 includes the planar shutter device 4, the light guide plate 2, the optical sensor 81, and the light sources 71. The planar shutter device 4 can change the transmittance of light and is disposed so as to overlap the Z2 side of the light guide plate 2.

The detection device 100 includes the planar shutter device 4, and therefore, can obtain the base image data, the captured image data, and the differential image data obtained based on the difference between the base image data and captured image data. The captured image data is the image data of the object to be detected 110, which is obtained by the detection using the optical sensor 81. The captured image data includes the base image data. The base image data does not include data obtained by detecting the light 120 reflected from the object to be detected 110 using the optical sensor 81. Therefore, the detection device 100 according to the present embodiment can achieve higher accuracy of detection by obtaining the differential image data based on the difference between the base image data and the captured image data.

The detection device 100 includes the object placement stage 111, which is light-transmitting, that is disposed so as to overlap the Z2 side of the planar shutter device 4 and on which the object to be detected 110 is placed. With this configuration, when the object to be detected 110 is, for example, microorganisms such as bacteria or a sample containing bacteria, the object to be detected 110 can be placed using the object placement stage 111, so that the detection operation becomes easier.

The light guide plate 2 is provided with the scatterers 3 (optical structure). The optical structure causes the light 120 incident from the light sources 71 to exit from the second surface 22 of the light guide plate 2. Thus, the optical structure scatters the light 120, and therefore, can emit the light 120 propagating in the light guide plate 2 toward the object to be detected 110. Therefore, the accuracy of detection of the object to be detected 110 increases.

The optical structure is provided on the first surface 21 of the light guide plate 2.

The planar shutter device 4 is disposed on the second surface 22 side of the light guide plate 2. Therefore, the optical structure can be formed on the first surface 21 side of the light guide plate 2, and the light 123 can be scattered by the optical structure and transmitted through the light guide plate 2 to reach the planar shutter device 4 on the second surface 22 side.

The optical structure is the scatterers 3 that scatter the light 120 that has propagated in the light guide plate 2 and reached the optical structure. Thus, the scatterers 3 can cause the light 120 propagating in the light guide plate 2 to exit toward the object to be detected 110.

The optical filter 82 is provided between the light guide plate 2 and the optical sensor 81.

With this configuration, the optical filter 82 can block light from oblique directions, and thereby can reduce blurring of the image that is captured by the photodiodes 813.

The storage circuit 757 and the image generation circuit 756 are provided in the detection device. The storage circuit 757 stores therein the base image data obtained by detecting, using the optical sensor 81, the light 120 emitted from the light sources 71 while the planar shutter device 4 is in the non-light-transmitting state. The image generation circuit 756 acquires the captured image data obtained by detecting, using the optical sensor 81, the light 120 emitted from the light sources 71 while the planar shutter device 4 is in the light-transmitting state. The image generation circuit 756 obtains, based on the difference between the base image data and the captured image data, the differential image data indicating the detection result in the state where the object to be detected 110 is placed on the object placement stage 111.

The captured image data is the image data of the object to be detected 110 that is obtained by the detection using the optical sensor 81. The captured image data includes the base image data. The base image data does not include the data obtained by detecting the light 120 reflected from the object to be detected 110 using the optical sensor 81. Therefore, the detection device 100 according to the present embodiment can achieve the higher accuracy of detection by obtaining the differential image data based on the difference between the base image data and the captured image data.

The planar shutter device 4 is the liquid crystal shutter 41, and after power is turned on, the process to store the base image data in the storage circuit 757 is automatically performed.

This configuration is convenient because the process to store the base image data is automatically performed after power is turned on. The liquid crystal shutter 41 has an advantage of opening and closing faster than an electrochromic shutter 42.

Second Embodiment

Figure 10:
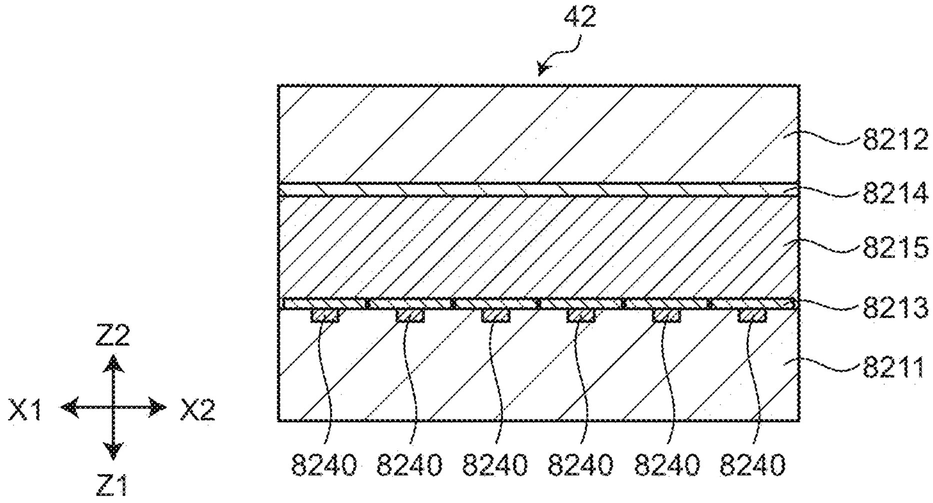
FIG. 10 is a schematic view illustrating a section of an electrochromic shutter according to a second embodiment of the present disclosure.
Figure 11:
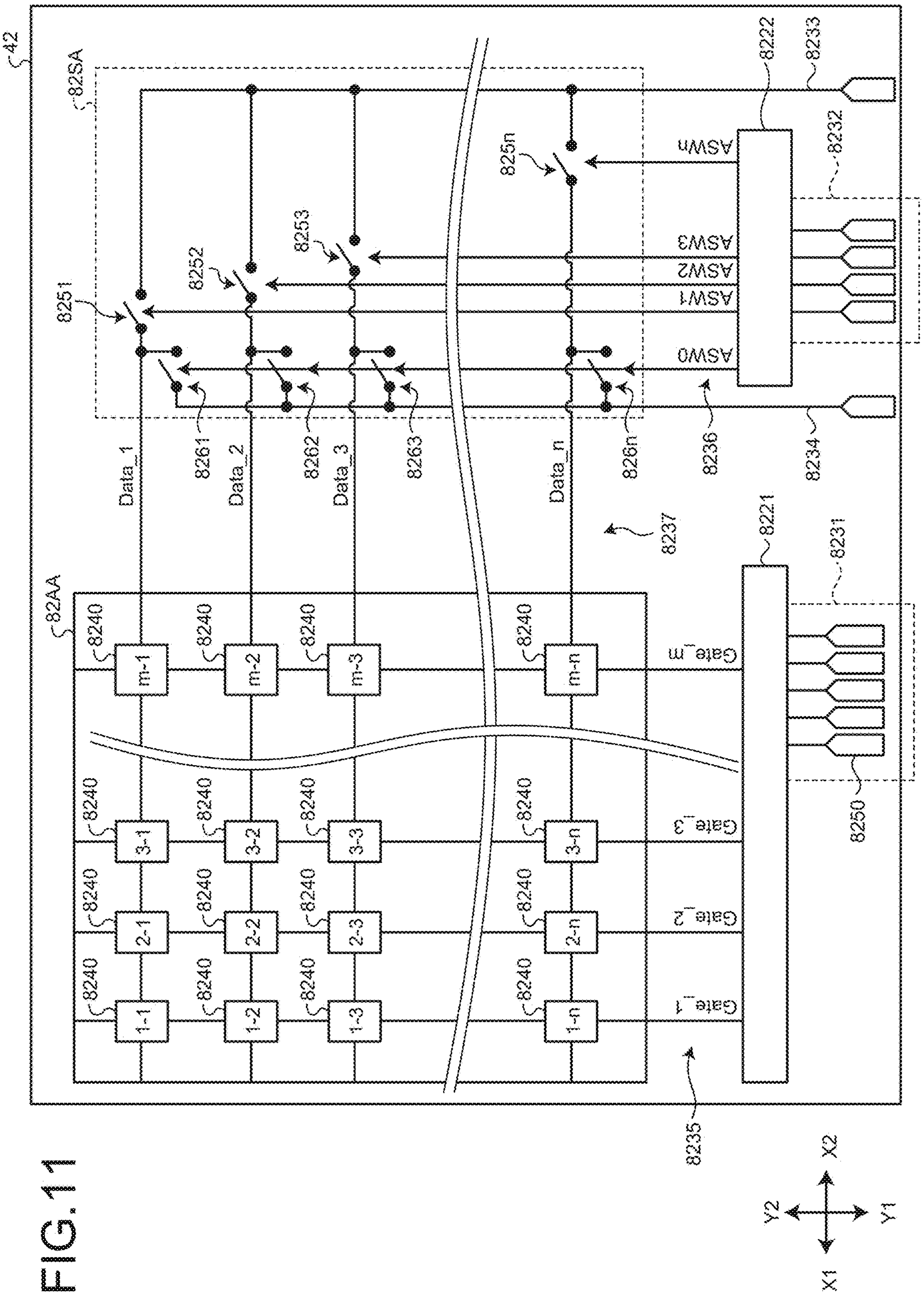
FIG. 11 is a schematic diagram illustrating a configuration example of the electrochromic shutter.
Figure 12:
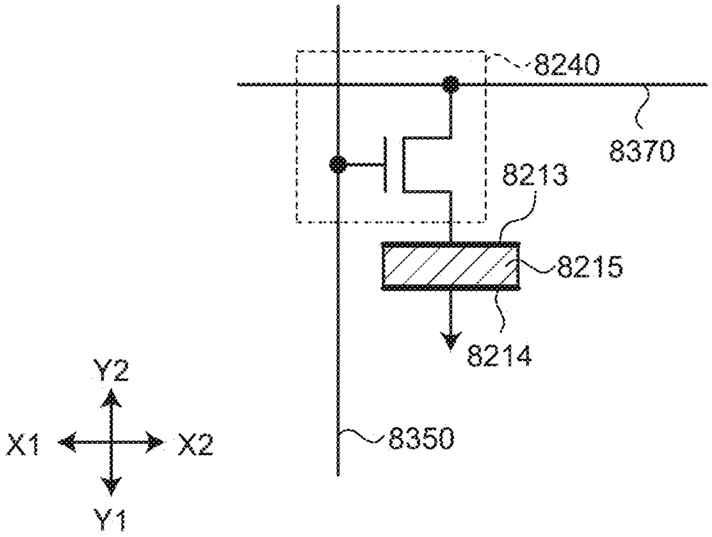
FIG. 12 is a schematic circuit diagram illustrating a configuration of a switching element in the electrochromic shutter.

The following describes a second embodiment of the present disclosure. FIG. 10 is a schematic view illustrating a section of the electrochromic shutter according to the second embodiment. FIG. 11 is a schematic diagram illustrating a configuration example of the electrochromic shutter. FIG. 12 is a schematic circuit diagram illustrating a configuration of a switching element in the electrochromic shutter.

The following describes the electrochromic shutter 42. In the following description, the term "electrochromic" in the electrochromic shutter may be abbreviated simply as "EC". That is, for example, the term "electrochromic shutter" may be referred to as "EC shutter" and "electrochromic material" as "EC material". "EC" stands for "electrochromic".

As illustrated in FIG. 10, the electrochromic shutter 42 includes a first substrate 8211, a second substrate 8212, and an electrochromic material 8215. The EC material 8215 is interposed between the first substrate 8211 and the second substrate 8212 in the Z direction. The EC shutter 42 is a device that uses the EC material 8215 that is reversibly controllable between the light-transmitting and non-light-transmitting states by controlling the voltage applied thereto. Examples of the EC material 8215 include ion-inserted metallic oxides, such as chromium oxide ($Cr_2O_3$) and tungsten oxide ($WO_3$), but are not limited to these materials, and other materials that cause similar phenomena may be employed.

The first substrate 8211 and the second substrate 8212 are light-transmitting substrates, such as glass substrates. A first electrode 8213 is formed on a surface on the EC material 8215 side of the first substrate 8211. A second electrode 8214 is formed on a surface on the EC material 8215 side of the second substrate 8212. A switching element 8240 is coupled to the first electrode 8213. A voltage applied to the EC material 8215 is determined by a potential difference between the first electrode 8213 and the second electrode 8214. In the present embodiment, the second electrode 8214 is supplied with a constant potential.

As illustrated in FIG. 11, the EC shutter 42 has an active area 82AA and a switching circuit area 82SA. A plurality of the switching elements 8240 are arranged in a matrix having a row-column configuration in the active area 82AA.

In the EC shutter 42, signals input via wiring 8231 are supplied as drive signals to the active area 82AA via a gate driver 8221 and wiring 8235. Signals input via wiring 8232 are supplied to the switching circuit area 82SA via a decoder 8222 and wiring 8236. A potential of a signal input via a wiring line 8233 is supplied as an applied potential to the active area 82AA via the switching circuit area 82SA and wiring 8237. A potential of a signal input via a wiring line 8234 is supplied as a reset potential to the active area 82AA via the switching circuit area 82SA and the wiring 8237.

FIG. 12 is the schematic circuit diagram illustrating the configuration of the switching element in the electrochromic shutter. The switching element 8240 illustrated in FIG. 12 is a field-effect transistor (FET). The gate of the switching element 8240 is coupled to a scan line 8350. One of the source and the drain of the switching element 8240 is coupled to a transmission line 8370. The other of the source and the drain of the switching element 8240 is coupled to the first electrode 8213. That is, at the time when a signal (drive signal) is supplied to the gate via the scan line 8350, the switching element 8240 supplies the first electrode 8213 with a potential corresponding to a potential (for example, the applied potential or the reset potential) given by a signal transmitted via the transmission line 8370.

The transmission line 8370 illustrated in FIG. 12 is one of the transmission lines Data_1, Data_2, Data_3, . . . , Data_n illustrated in FIG. 11. The wiring 8237 includes a plurality of transmission lines, such as the transmission lines Data_1, Data_2, Data_3, . . . , Data_n illustrated in FIG. 11. The transmission lines are coupled to the wiring line 8233 via the switching circuit area 82SA. n is a natural number equal to or larger than two that indicates the number of the switching elements 8240 arranged in the Y direction and the number of the transmission lines. The switching elements 8240 arranged in the X direction share the same transmission line with one another.

A plurality of transmission lines such as the transmission lines Data_1, Data_2, Data_3, . . . , Data_n are coupled to the wiring line 8233 via individual first switches 8251, 8252, 8253, . . . , 825*n*, respectively. As illustrated in FIG. 11, the transmission line Data_1 is coupled to the wiring line 8233 via the first switch 8251. The transmission line Data_2 is coupled to the wiring line 8233 via the first switch 8252. The transmission line Data_3 is coupled to the wiring line 8233 via the first switch 8253. In the same way as these transmission lines, the transmission line Data_n is coupled to the wiring line 8233 via the first switch 825*n*.

A plurality of transmission lines such as the transmission lines Data_1, Data_2, Data_3, . . . , Data_n are coupled to the wiring line 8234 via individual second switches 8261, 8262, 8263, . . . , 826*n*, respectively. As illustrated in FIG. 11, the transmission line Data_1 is coupled to the wiring line 8234 via the second switch 8261. The transmission line Data_2 is coupled to the wiring line 8234 via the second switch 8262. The transmission line Data_3 is coupled to the wiring line 8234 via the second switch 8263. In the same way as these transmission lines, the transmission line Data_n is coupled to the wiring line 8234 via the second switch 826*n*. The positions where the transmission lines are coupled to the second switches 8261, 8262, 8263, . . . , 826*n* are closer to the active area 82AA than the positions where the transmission lines are coupled to the first switches 8251, 8252, 8253, . . . 825*n* are.

The first switches 8251, 8252, 8253, . . . , 825*n* and the second switches 8261, 8262, 8263, . . . , 826*n* operate under the control of the decoder 8222.

The decoder 8222 is coupled to wiring lines ASW1, ASW2, ASW3, . . . , ASWn that transmit signals to individually control the first switches 8251, 8252, 8253, . . . , 825*n*. As illustrated in FIG. 11, the wiring line ASW1 couples the decoder 8222 to the first switch 8251. The wiring line ASW2 couples the decoder 8222 to the first switch 8252. The wiring line ASW3 couples the decoder 8222 to the first switch 8253. In the same way as these pieces of wiring, the wiring line ASWn couples the decoder 8222 to the first switch 825*n*. The wiring 8236 includes the wiring lines ASW1, ASW2, ASW3, . . . , ASWn.

The decoder 8222 is also coupled to a wiring line ASW0 that transmits a signal to collectively control the second switches 8261, 8262, 8263, . . . , 826*n*. The wiring line ASW0 couples the decoder 8222 to the second switches 8261, 8262, 8263, . . . , 826*n*. The wiring 8236 further includes the wiring line ASW0 in addition to the wiring lines ASW1, ASW2, ASW3, . . . , ASWn.

The decoder 8222 operates based on signals supplied from a host 8225 via the wiring 8232 and controls operations of the first switches 8251, 8252, 8253, . . . , 825*n* and the second switches 8261, 8262, 8263, . . . , 826*n*. More specifically, the decoder 8222 serves as what is called a combinational logic circuit and can control the operations of the first switches 8251, 8252, 8253, . . . , 825*n* and the second switches 8261, 8262, 8263, . . . , 826*n* based on signals supplied via the wiring 8232 that includes wiring lines fewer than the number of wiring lines included in wiring 8236.

The scan line 8350 illustrated in FIG. 12 is one of scan lines Gate_1, Gate_2, Gate_3, . . . , Gate_m illustrated in FIG. 11. The wiring 8235 includes a plurality of scan lines, such as the scan lines Gate_1, Gate_2, Gate_3, . . . , Gate_m illustrated in FIG. 11. The gate driver 8221 operates based on signals supplied from the host 8225 via the wiring 8231, and sequentially provides drive signals to the scan lines Gate_1, Gate_2, Gate_3, . . . , Gate_m. m is a natural number equal to or larger than two and indicates the number of the switching elements 8240 arranged in the X direction and the number of the scan lines. The switching elements 8240 arranged in the Y direction share the same scan line with one another.

Flowcharts according to the second embodiment can be obtained by substituting “electrochromic shutter” for “liquid crystal shutter” in the flowcharts of the first embodiment illustrated in FIGS. 7 to 9.

As described above, in the second embodiment, the planar shutter device 4 is the electrochromic shutter 42, and after power is turned on, the process to store the base image data in the storage circuit 757 is automatically performed.

This configuration is convenient because the process to store the base image data is automatically performed after power is turned on. The electrochromic shutter 42 is advantageous in that the maximum transmittance of light is higher than that of the liquid crystal shutter 41.

Third Embodiment

Figure 13A:
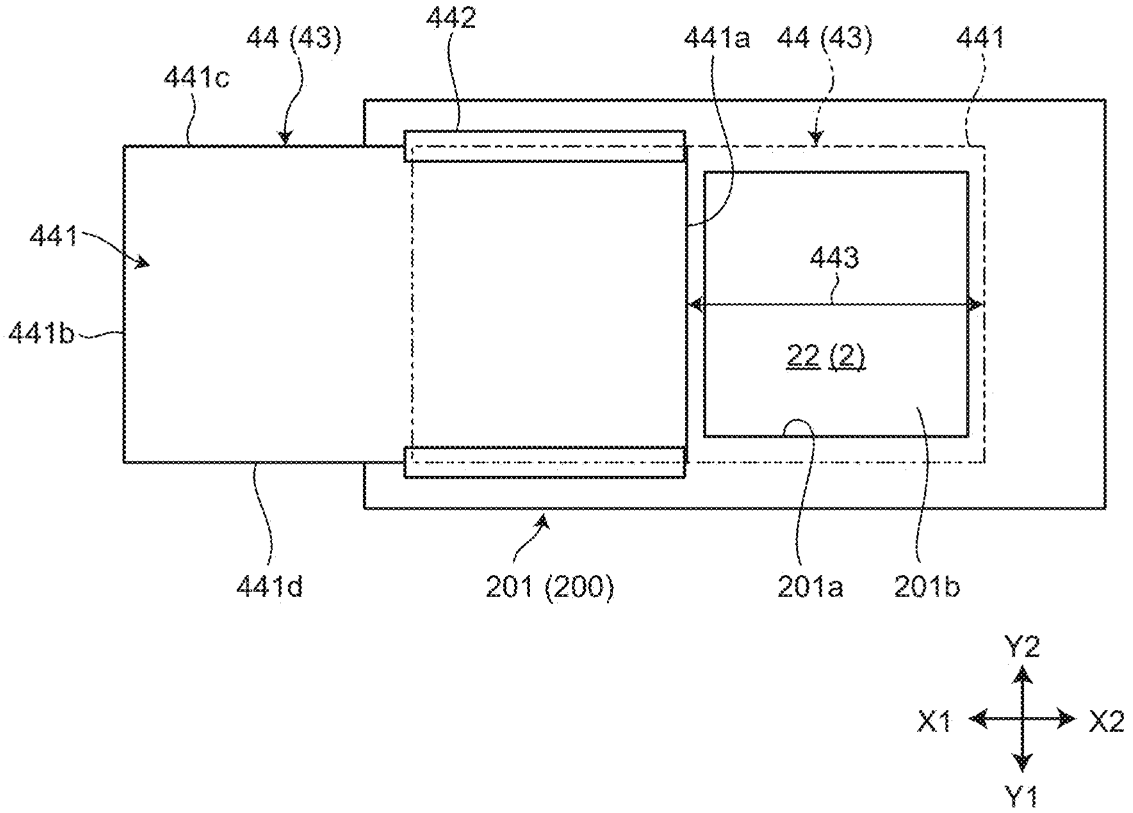
FIG. 13A is a schematic view of a sliding shutter according to a third embodiment of the present disclosure as viewed in plan view.
Figure 13B:
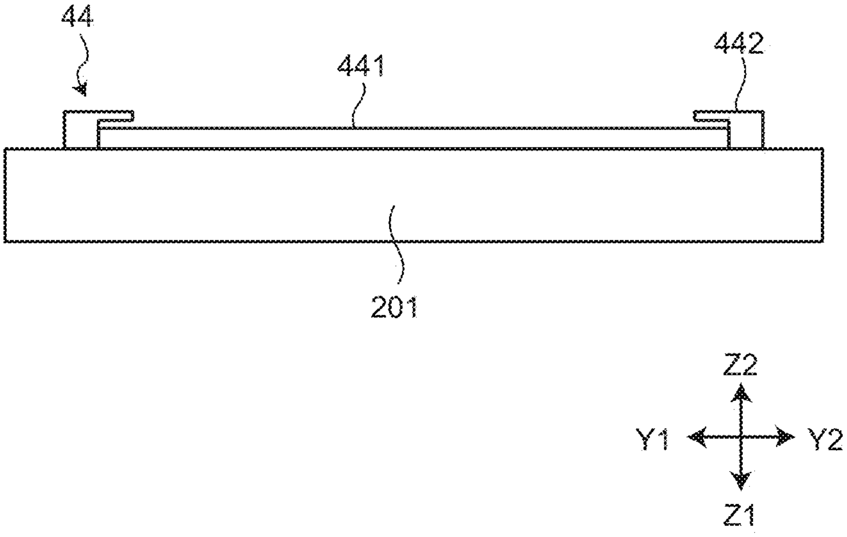
FIG. 13B is a side view of FIG. 13A.
Figure 14A:
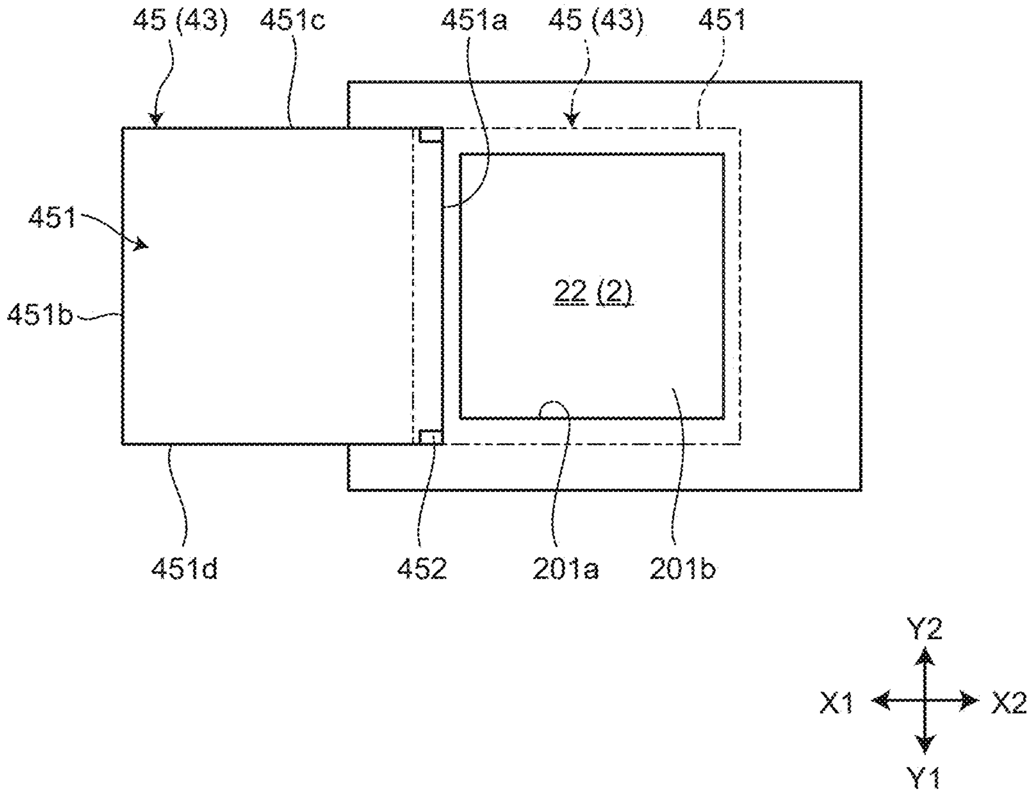
FIG. 14A is a schematic view of a rotary shutter according to the third embodiment as viewed in plan view.
Figure 14B:
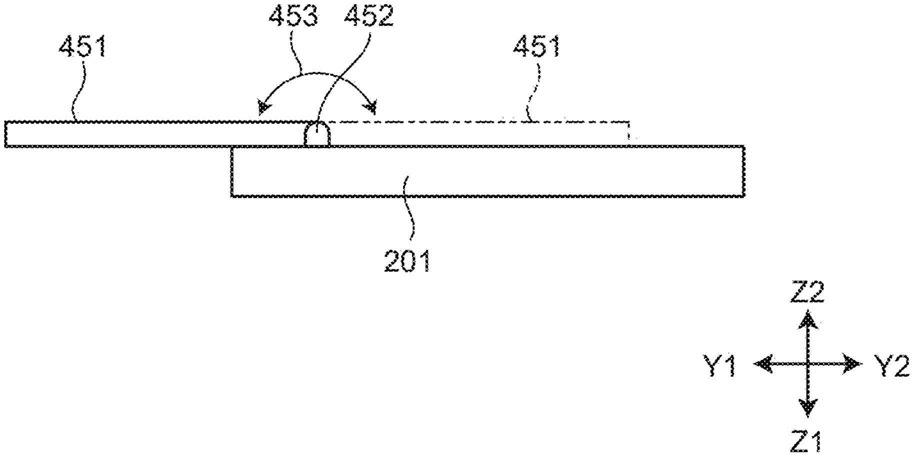
FIG. 14B is a side view of FIG. 14A.

The following describes a third embodiment of the present disclosure. FIG. 13A is a schematic view of a sliding shutter according to the third embodiment as viewed in plan view. FIG. 13B is a side view of FIG. 13A. FIG. 14A is a schematic view of a rotary shutter according to the third embodiment as viewed in plan view. FIG. 14B is a side view of FIG. 14A.

In the third embodiment, a manual shutter 43 serving as an example of the planar shutter device 4 will be described. The manual shutter 43 is exemplified by a sliding shutter 44 or a rotary shutter 45. The sliding shutter 44 will first be described.

As illustrated in FIGS. 13A and 13B, the sliding shutter 44 include a shutter body 441 and guide rails 442. The sliding shutter 44 is provided on the top surface 201 of the housing 200. The top surface 201 is provided with an opening 201*b*. That is, the inside of an opening edge 201*a* that is rectangular in plan view serves as the opening 201*b*. The second surface 22 of the light guide plate 2 is visible from the upper side (Z2 side) through the opening 201*b*. That is, light passes through the opening 201*b* when the opening 201*b* is open.

The shutter body 441 has a rectangular shape that is long in the X direction. The shutter body 441 has edges 441*a*, 441*b*, 441*c*, and 441*d*. The Y-directional length of the shutter body 441 is longer than the Y-directional length of the opening 201*b*. The X-directional length of the shutter body 441 is longer than twice the X-directional length of the opening 201*b*. The guide rails 442 are provided in pairs on Y1 and Y2 sides. The guide rails 442 each have an L-shape when viewed in the X direction. The guide rails 442 extend in the X direction. The edges 441*c* and 441*d* of the shutter body 441 are slidably supported on the pair of guide rails 442. The X2-side edges of the guide rails 442 are located on the X1 side of an X1-side end of the opening edge 201*a*. The shutter body 441 is slidable in the X direction along the pair of guide rails 442. In FIG. 13A, the shutter body 441 illustrated with a solid line indicates a state where the entire area of the opening 201*b* is open, and the shutter body 441 illustrated with a long dashed double-short dashed line indicates a state where the entire area of the opening 201*b* is closed. That is, the shutter body 441 is slidable in the X direction within a sliding area 443.

The following describes the rotary shutter 45. As illustrated in FIGS. 14A and 14B, the rotary shutter 45 includes a shutter body 451 and a hinge 452. The rotary shutter 45 is provided on the top surface 201 of the housing 200. The top surface 201 is provided with the opening 201*b*.

The shutter body 451 has a rectangular shape. The shutter body 451 has edges 451*a*, 451*b*, 451*c*, and 451*d*. The Y-directional length of the shutter body 451 is longer than the Y-directional length of the opening 201*b*. The X-directional length of the shutter body 451 is longer than the X-directional length of the opening 201*b*. The hinges 452 are provided in pairs on the Y1 and Y2 sides. The shutter body 451 is rotatably supported on the pair of hinges 452. That is, as illustrated in FIG. 14B, the shutter body 451 rotates along a rotational direction 453 indicated by an arrow. In FIGS. 14A and 14B, the shutter body 451 illustrated with a solid line indicates a state where the entire area of the opening 201*b* is open, and the shutter body 451 illustrated with a long dashed double-short dashed line indicates a state where the entire area of the opening 201*b* is closed.

Figure 15:
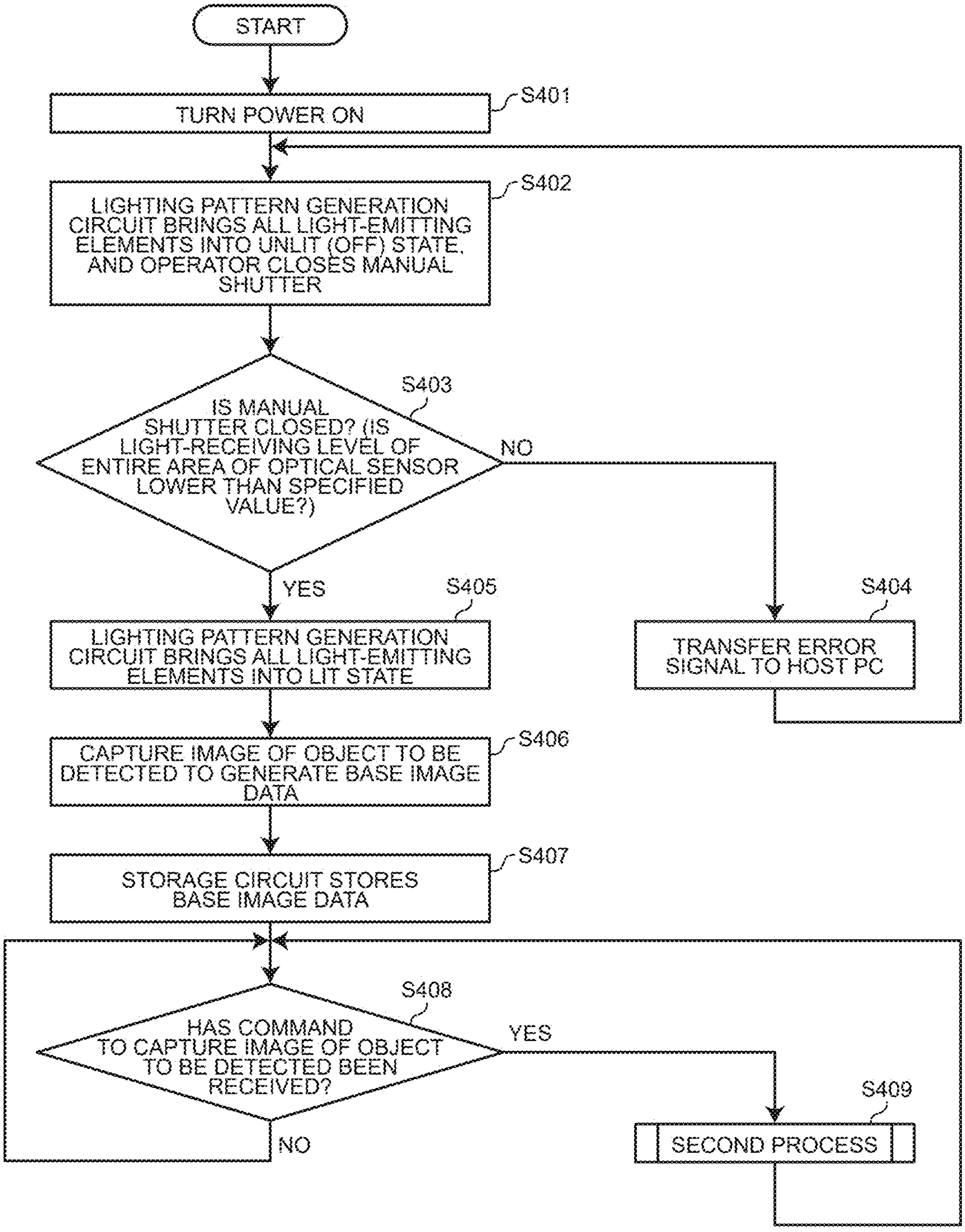
FIG. 15 is a flowchart illustrating an aspect of an exemplary detection operation of the detection device according to the third embodiment.

The following describes an exemplary detection operation of the detection device according to the third embodiment with reference to FIG. 15. FIG. 15 is a flowchart illustrating an aspect of the exemplary detection operation of the detection device according to the third embodiment.

First, as illustrated in FIG. 15, at Step S401, the power of the detection device 100 is turned on to start the detection device 100. Then, the lighting pattern generation circuit 754 (refer to FIG. 6) brings all the light sources 71 into the unlit (off) state, and an operator closes the entire area of the opening 201*b* of the housing 200 with the manual shutter 43 (Step S402). At Step S403, the signal control IC 75 determines whether the manual shutter is closed. Specifically, the signal control IC 75 detects the light-receiving level of the entire area of the optical sensor 81 and determines whether the light-receiving level is lower than a specified value. If the light-receiving level is determined to be lower than the specified value, the manual shutter is determined to be closed, and a process at Step S405 is performed. If the light-receiving level is determined to be higher than the specified value, the manual shutter is determined to be open; an error signal is transferred to the host PC 758 (Step S404); and the processing returns to Step S402.

At Step S405, the lighting pattern generation circuit 754 brings all the light sources 71 into the lit state. Consequently, the operator closes the entire area of the opening 201*b* with the manual shutter 43 and the light sources 71 are placed in the lit state. The image generation circuit 756 captures the image of the object to be detected 110 to generate the base image data (Step S406), and the storage circuit 757 stores therein the base image data (Step S407). As a result, the base image data in the state where the entire area of the opening 201*b* is closed by the manual shutter 43 is stored in the storage circuit 757.

Then, the signal control IC 75 determines whether the command signal to capture the image of the object to be detected 110 has been received (Step S408). If the signal control IC 75 determines that the command signal has not been received, the signal control IC 75 performs the process at Step S408 again. If the signal control IC 75 determines that the command signal has been received, the signal control IC 75 performs a process at Step S409. The process at Step S409 is the second process illustrated in FIG. 9 and has already been described. After Step S409, the processing returns to Step S408 and the presence or absence of the next image capturing command is checked. Then, the process at Step S409 is repeated.

As described above, the planar shutter device 4 is the manual shutter 43. After power is turned on, when a predetermined condition is met, the process to store the base image data in the storage circuit 757 is performed. The predetermined condition is that the output of the optical sensor 81 is an output when the manual shutter 43 is closed. That is, "the predetermined condition is met" refers to that the signal control IC 75 detects the light-receiving level of the entire area of the optical sensor 81 and determines that the light-receiving level is lower than the specified value.

The manual shutter 43 has a higher light-blocking ratio than the liquid crystal shutter 41 and the electrochromic shutter 42, when the shutter is closed. Therefore, the detection device 100 according to the present embodiment can achieve the higher accuracy of detection.

What is claimed is:

1. A detection device comprising:
a planar shutter device capable of changing transmittance of light;
a light-transmitting light guide plate that overlaps one side of the planar shutter device in a first direction;
an optical sensor that overlaps one side of the light guide plate in the first direction and comprises a plurality of photodiodes arranged in a plane; and
a light source that is disposed adjacent to the light guide plate in a second direction intersecting the first direction and is configured to emit light to a side surface of the light guide plate.

2. The detection device according to claim 1, comprising an object placement stage that is disposed so as to overlap another side of the planar shutter device in the first direction and on which an object to be detected is placed.

3. The detection device according to claim 2, wherein the object placement stage has a light-transmitting property.

4. The detection device according to claim 2, wherein the light guide plate is provided with an optical structure configured to cause the light incident from the light source to exit from a surface on another side of the light guide plate in the first direction.

5. The detection device according to claim 4, wherein the optical structure is provided on a surface on one side of the light guide plate in the first direction.

6. The detection device according to claim 4, wherein the optical structure is a plurality of scatterers configured to scatter the light that has propagated in the light guide plate and reached the optical structure.

7. The detection device according to claim 4, wherein an optical filter is provided between the light guide plate and the optical sensor.

8. The detection device according to claim 6, comprising:
a storage circuit configured to store base image data obtained by detecting, using the optical sensor, the light emitted from the light source when the planar shutter device is in a non-light-transmitting state; and
an image generation circuit configured to
acquire captured image data obtained by detecting, using the optical sensor, the light emitted from the light source when the planar shutter device is in a light-transmitting state, and
obtain differential image data based on a difference between the base image data and the captured image data.

9. The detection device according to claim 8, wherein
the planar shutter device is a liquid crystal shutter, and
after power is turned on, a process to store the base image data in the storage circuit is automatically performed.

10. The detection device according to claim 8, wherein
the planar shutter device is an electrochromic shutter, and after power is turned on, a process to store the base image data in the storage circuit is automatically performed.

11. The detection device according to claim 8, wherein the planar shutter device is a manual shutter, and after power is turned on, when a predetermined condition is met, a process to store the base image data in the storage circuit is performed, where the predetermined condition is that an output of the optical sensor is an output when the manual shutter is closed.

* * * * *